US012700153B2

(12) United States Patent
    Kim et al.

(10) Patent No.: US 12,700,153 B2
(45) Date of Patent: Aug. 4, 2026

(54) METHOD AND SYSTEM FOR GENERATING IMAGE IN THE DRAWINGS STYLE OF SPECIFIC CONTENT

(71) Applicant: NAVER WEBTOON LTD.,
    Seongnam-si (KR)

(72) Inventors: Tae Hyun Kim, Seongnam-si (KR); Jee Soo Kim, Seongnam-si (KR); Ji Eun Lee, Seongnam-si (KR); Dong Hyun Lee, Seongnam-si (KR); In Song Lee, Seongnam-si (KR); Jae Woo Hong, Seongnam-si (KR); Han Chang Seo, Seongnam-si (KR); Ji Hoon Lee, Seongnam-si (KR); Sung Hun Lee, Seongnam-si (KR); Seung Kwon Kim, Seongnam-si (KR); Seung Hun Nam, Seongnam-si (KR); Sang Yeon Kim, Seongnam-si (KR); Choong Hyun Seo, Seongnam-si (KR); Ju Yul Park, Seongnam-si (KR)

(73) Assignee: NAVER WEBTOON LTD.,
    Seongnam-si (KR)

( * ) Notice: Subject to any disclaimer, the term of this patent is extended or adjusted under 35 U.S.C. 154(b) by 162 days.

(21) Appl. No.: 18/659,560

(22) Filed: May 9, 2024

(65) Prior Publication Data

US 2024/0378780 A1     Nov. 14, 2024

(30) Foreign Application Priority Data

May 11, 2023   (KR) ........................ 10-2023-0061336
    Sep. 13, 2023  (KR) ........................ 10-2023-0122091

(51) Int. Cl.
    *G06T 11/60*      (2026.01)
    *G06F 3/04817*    (2022.01)
    (Continued)

(52) U.S. Cl.
    CPC .......... *G06T 11/60* (2013.01); *G06F 3/04817* (2013.01); *G06F 3/04845* (2013.01); *G06T 11/23* (2026.01)

(58) Field of Classification Search
    CPC ....................................................... G06T 11/60
    See application file for complete search history.

(56) References Cited

U.S. PATENT DOCUMENTS

2006/0082579 A1 *  4/2006  Yao ......................... G06T 11/00
                                                                   345/473
    2021/0243503 A1 *  8/2021  Kotsopoulos ........ H04N 21/472

FOREIGN PATENT DOCUMENTS

KR       1020150085195 A     7/2015
    KR         102099093 B1      4/2020
                 (Continued)

OTHER PUBLICATIONS

Office Action for the corresponding KR application No. 10-2023-0122091, dated Sep. 15, 2025.

*Primary Examiner* — Shivang I Patel
(74) *Attorney, Agent, or Firm* — Greer Burns & Crain Ltd.

(57)     ABSTRACT

A method of generating an image according to the present invention includes receiving a specific content selected from a user terminal among a plurality of contents provided from a content providing service, specifying a source image based on the selected specific content, generating a resulting image using the source image and a drawing style of the specific content, and providing the resulting image to the user terminal.

17 Claims, 16 Drawing Sheets

(51) Int. Cl.
    *G06F 3/04845*     (2022.01)
    *G06T 11/23*      (2026.01)

(56)             References Cited

FOREIGN PATENT DOCUMENTS

| KR | 1020200041588 A | 4/2020 |
| KR | 102169073 B1 | 10/2020 |
| KR | 1020210115408 A | 9/2021 |
| KR | 102399255 B1 | 5/2022 |
| KR | 102401985 B1 | 5/2022 |
| KR | 1020230059603 A | 5/2023 |

* cited by examiner

Figure 4C:
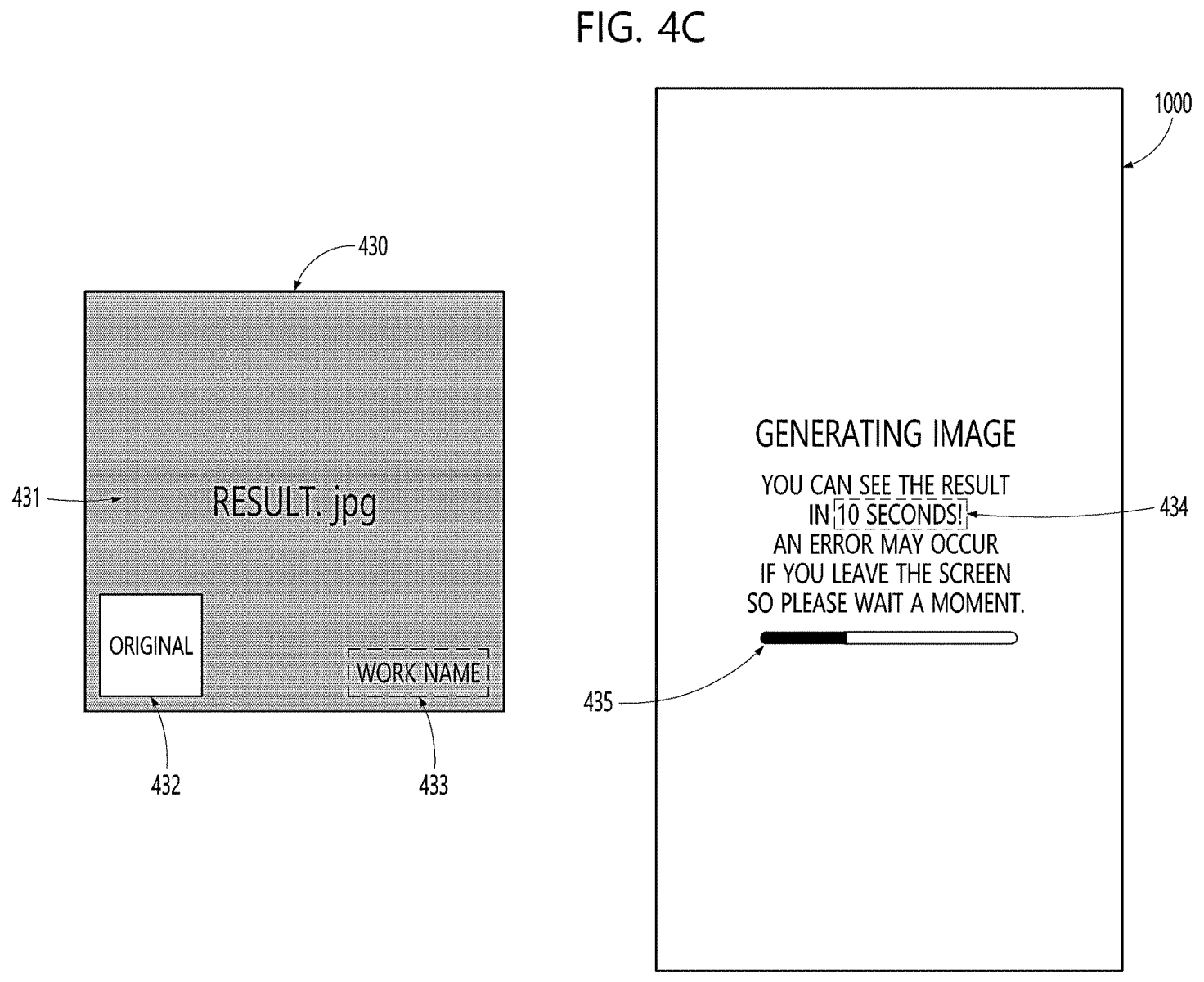

GENERATING IMAGE

YOU CAN SEE THE RESULT
IN 10 SECONDS!
AN ERROR MAY OCCUR
IF YOU LEAVE THE SCREEN
SO PLEASE WAIT A MOMENT.

1000

434

435

430

RESULT.jpg

431

ORIGINAL

432

WORK NAME

Figure 5C:
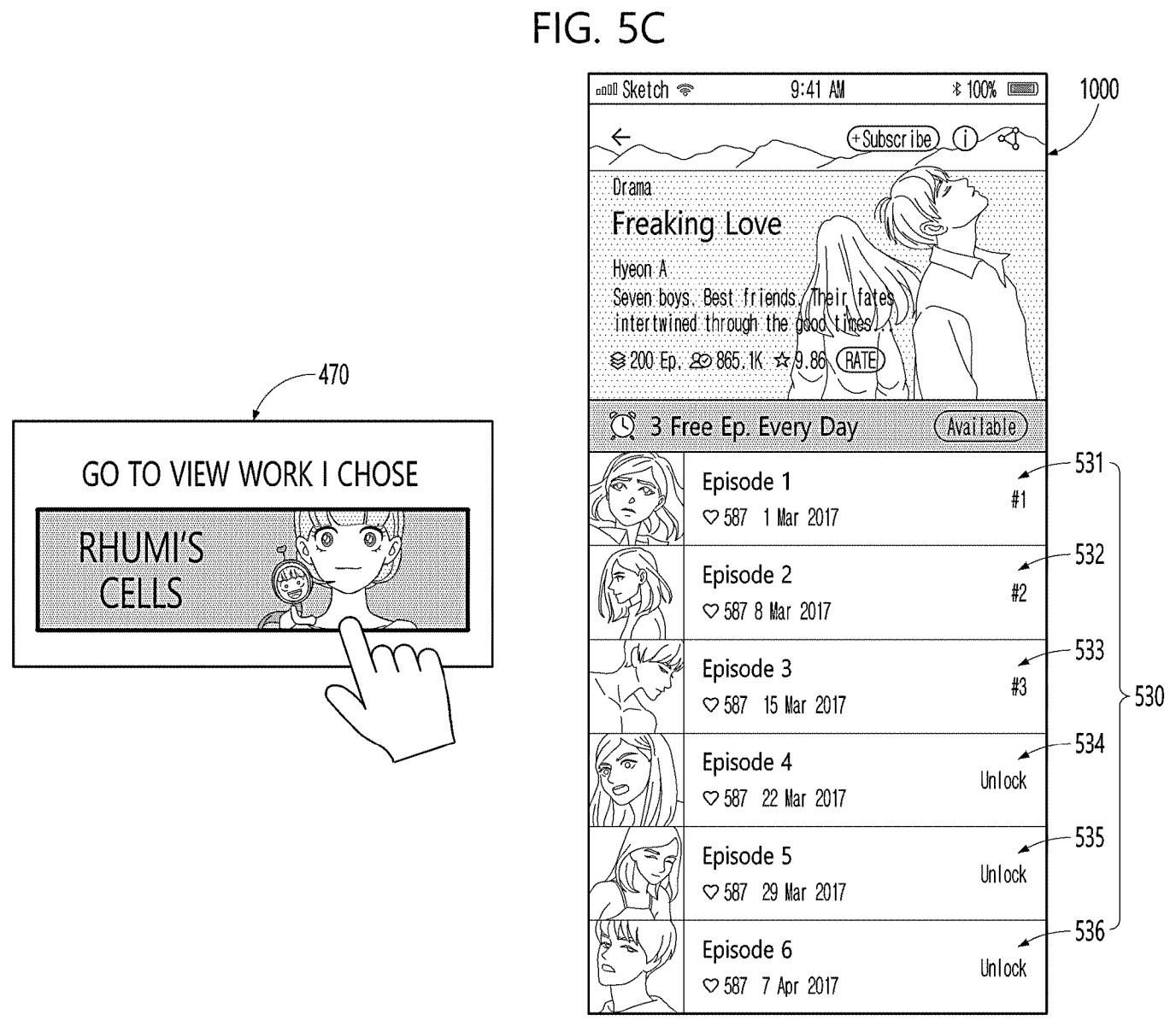

Sketch  9:41 AM  100%

↑  + Subscribe  (i)

Drama
Freaking Love
Hyeon A
Seven boys: Best friends. Their fates
intertwined through the best times...

200 Ep.  865.1K  9.86  RATE

3 Free Ep. Every Day    Available

531 → Episode 1    #1
587  1 Mar 2017

532 → Episode 2    #2
587  8 Mar 2017

533 → Episode 3    #3
587  15 Mar 2017

534 → Episode 4    Unlock
587  22 Mar 2017

535 → Episode 5    Unlock
587  29 Mar 2017

536 → Episode 6    Unlock
587  7 Apr 2017

530

470

GO TO VIEW WORK I CHOSE

RHUMI'S
CELLS

440

441

| SAVE ONLY THIS IMAGE | — 541 |
| SAVE ALL IMAGES | — 542 |
| SAVE IT AS GIF FILE | — 543 |

METHOD AND SYSTEM FOR GENERATING IMAGE IN THE DRAWINGS STYLE OF SPECIFIC CONTENT

CROSS REFERENCE TO RELATED APPLICATION

The present application claims priority to Korean Patent Application Nos. 10-2023-0061336, filed on May 11, 2023 and 10-2023-0122091, filed on Sep. 13, 2023, the entire contents of which are incorporated herein by reference.

BACKGROUND OF THE INVENTION

Field of the Invention

The present invention relates to a method and a system for generating an image based on a content.

Description of the Related Art

As technology advances, the use of digital devices are also increased. In particular, user terminals (e.g., smartphones or tablet PCs) are provided with various functions including not only communication functions such as a phone call or a text message, but also surfing the web, listening to music, and watching video contents using the Internet.

With the popularization of user terminals, the content industry is showing remarkable growth. Contents refer to various pieces of information or data provided through the Internet, computer communication, or the like and may be of very various types. For example, contents may include webcomics, web novels, music, e-books, articles, videos, TV program videos, images, and the like.

A webcomic is a representative example of actively consumed content. A webcomic is a comic serialized and distributed through Internet communication networks and is a compound word of "web" and "cartoon."

As the consumption of the webcomic continuously increases, various webcomic-related service providers are developing various services to encourage more consumers to become interested in and consume their webcomics. As an example among them, various webcomic-related service providers divide a length of one book into several episodes, provide the divided episodes to consumers, and encourage continuous consumption of the episodes.

As another example, Korean Patent Laid-Open Application No. 10-2015-0085195 (METHOD AND SYSTEM FOR PROVIDING WEBCOMICS TO WHICH ANIMATION EFFECTS ARE APPLIED TO USER TERMINALS) proposes a method of providing webcomics to which animation effects are applied.

As described above, various studies are being conducted to stimulate consumers' consumption and interest in contents. As described above, there is still a need for attracting more consumers and at the same time, maintaining continuous consumption of contents by increasing consumers' purchase of contents.

SUMMARY OF THE INVENTION

The present invention relates to a method and a system for generating an image, which may allow users to easily access contents.

Furthermore, the present invention relates to a method and a system for generating an image, which may encourage users to continuously consume contents.

More specifically, the present invention relates to a method and a system for generating an image, which may translate source images selected by users into drawing styles of contents and provide the translated contents to the users.

A method of generating an image according to the present invention, which provides an image generating service using a content provided from a content providing service includes receiving a specific content selected from a user terminal among a plurality of contents provided from the content providing service, specifying a source image based on the selection of the user terminal, generating a resulting image using the source image and a drawing style of the specific content, and providing the resulting image to the user terminal.

A system for generating an image according to the present invention, which provides an image generating service using a content provided from a content providing service includes a control unit configured to receive a specific content selected from a user terminal among a plurality of contents provided from the content providing service, wherein the control unit is configured to specify a source image based on the selection of the user terminal, generate a resulting image using the source image and a drawing style of the specific content, and provide the resulting image to the user terminal.

A program according to the present invention is executed by one or more processors in a user terminal and stored in a computer-readable recording medium, wherein the program is to provide an image generating service using a content provided from a content providing service, and the program includes instructions which performs receiving a specific content selected from a user terminal among a plurality of contents provided from the content providing service, specifying a source image based on the selection of the user terminal, generating a resulting image using the source image and a drawing style of the specific content, and providing the resulting image to the user terminal.

The method and the system for generating the image according to the present invention may provide an image generating service using contents provided from a content providing service. More specifically, according to the present invention, specific contents and source images may be selected from user terminals. The users may receive resulting images obtained by translating drawing styles of the source images into the drawing styles of the specific contents only by selecting the specific contents.

Furthermore, the method and the system for generating the image according to the present invention may generate resulting images using the source images selected from user terminals and the drawing styles of the specific contents and provide the generated resulting images to the user terminals. The users may use contents in various ways by receiving resulting images obtained by translating source images desired by users into drawing styles of favorite contents. In addition, content service providers can achieve users' continuous consumption of contents and the introduction of new users by attracting the users' interest in contents.

BRIEF DESCRIPTION OF THE DRAWINGS

FIGS. 2A and 2B are illustrative diagrams for describing a source image, a target image, and a resulting image according to the present invention.

FIGS. 4A-4D, 5A-5E and 6A-6D are illustrative diagrams for describing an image generating service.

DETAILED DESCRIPTION OF THE INVENTION

Figure 1:
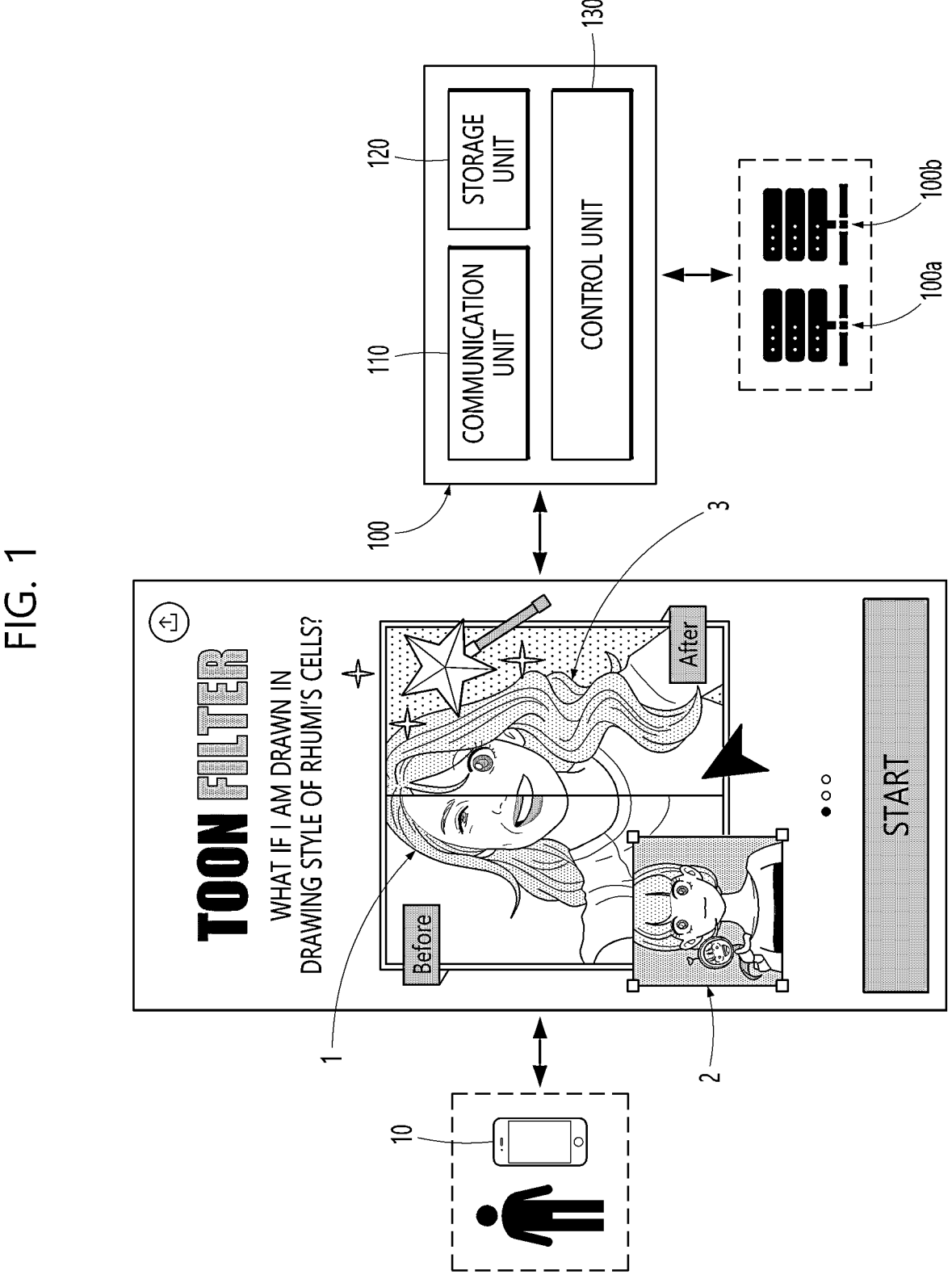
FIG. 1 is an illustrative diagram for describing a system for generating an image according to the present invention.

Hereinafter, embodiments disclosed in the specification will be described in detail with reference to the accompanying drawings, and the same or similar components are denoted by the same reference numerals regardless of the drawing symbols, and overlapping descriptions thereof will be omitted. The terms "module" and "unit" for components used in the following description are given or used interchangeably in consideration of ease of preparing the specification and do not have meanings or roles that are distinct from each other by themselves.

In addition, in describing the embodiments disclosed in this specification, when it is determined that a detailed description of a related known technology may obscure the gist of the embodiments disclosed in this specification, a detailed description thereof will be omitted.

In addition, the accompanying drawings are only for easy understanding of the embodiments disclosed in the specification, and it should be understood that the technical spirit disclosed in the specification is not limited by the accompanying drawings, and all changes, equivalents, or substitutes included in the spirit and technical scope of the present invention are included in the accompanying drawings.

Terms including ordinal numbers such as first or second may be used to describe various components, but the components are not limited by the terms. The terms are used only for the purpose of distinguishing one component from another.

When a first component is described as being "connected" or "coupled" to a second component, it should be understood that the first component may be directly connected or coupled to the second component or a third component may be present therebetween. On the other hand, when the first component is described as being "directly connected" or "directly coupled" to the second component, it should be understood that the third component is not present therebetween.

The singular expression includes the plural expression unless the context clearly dictates otherwise.

In the application, it should be understood that terms "include" and "have" are intended to specify that a feature, a number, a step, an operation, a component, a part, or a combination thereof described in the specification is present, but do not preclude the possibility of the presence or addition of one or more other features, numbers, steps, operations, components, parts, or combinations thereof.

The present invention relates to a system and a method for generating images, and in particular, images may be generated through "image to image translation" based on contents provided from a content service.

The types of contents which may be provided from the content service may be very diverse. For example, at least one of contents such as webcomics, music, e-books, videos, and images may be provided through the present invention.

Hereinafter, for convenience of description, a content corresponding to a webcomic (hereinafter referred to as "webcomic content") will be described as an example. Here, the webcomic is a compound word of "web" and "cartoon" and refers to a cartoon or comic provided through Internet communication networks.

In the present invention, a webcomic content may be composed of a plurality of sub-contents. The plurality of sub-contents may constitute a series of webcomic contents. Here, a series may refer to consecutive projects or contents.

In the present invention, in order to avoid confusion in terminology between the webcomic content and the sub-content, "sub-content" is referred to as "episode."

An episode may be composed of a plurality of scene images. It can be understood that the scene images are images corresponding to a plurality of scenes constituting the contents (stories) of the episodes.

In the present invention, "image to image translation" may be performed based on the drawing style of the webcomic content.

Here, the drawing style may refer to a drawing format of the webcomic content (or a graphic object), an author's unique drawing method, drawing style, and atmosphere, that is, visual feature (visual exterior). For example, a drawing style can be defined by sketch, drawing, painting, textures, shapes, aspect ratios, exteriors, appearances, colors, clarity, color temperatures, noises, render, sharpen, and the like of graphic objects (people, animals, objects, backgrounds, landscapes, letters, and the like) included in the content. In the present invention, a drawing style can be referred to as a painting style, cartoon style, or the like.

Figure 2A:
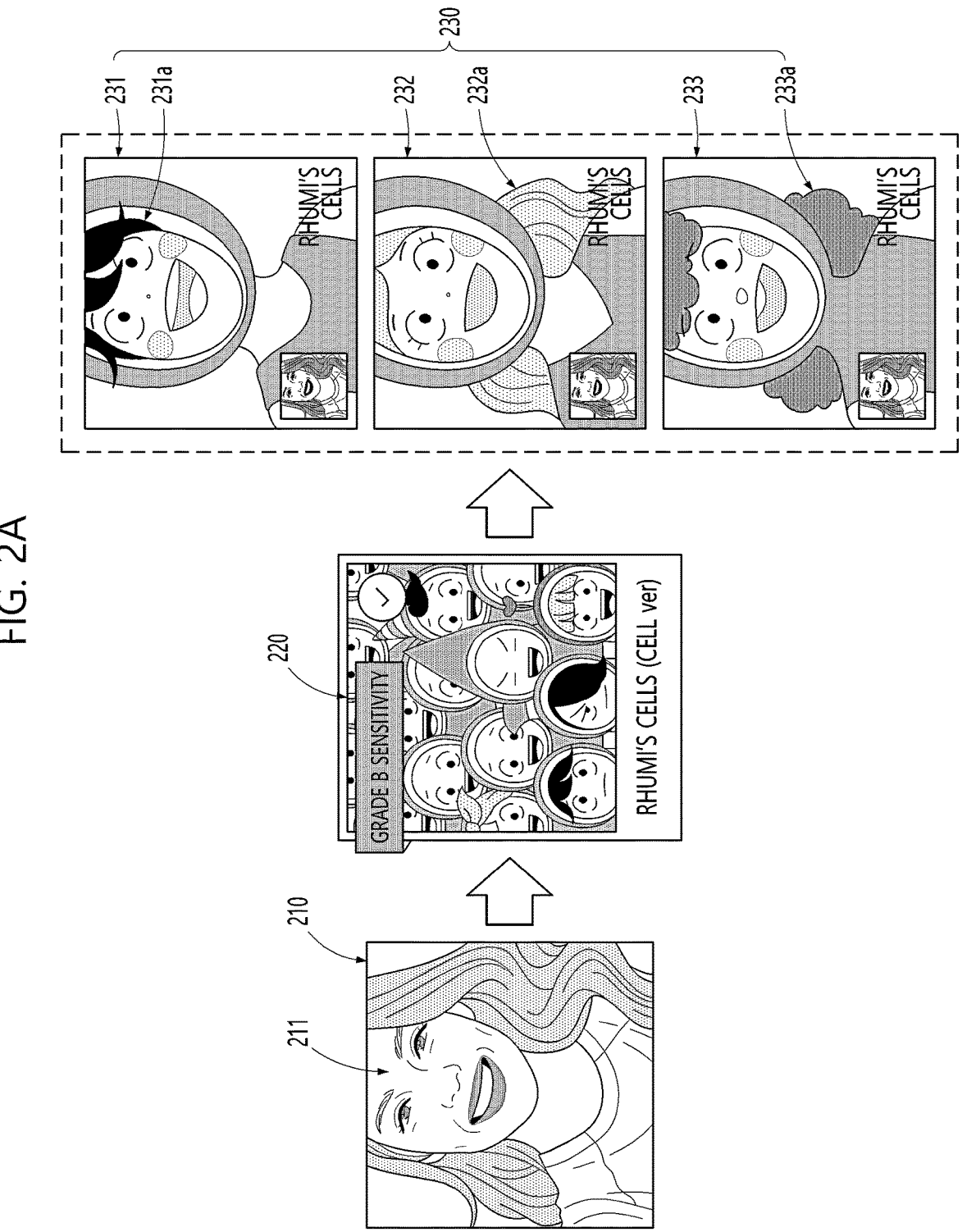
Figure 2B:
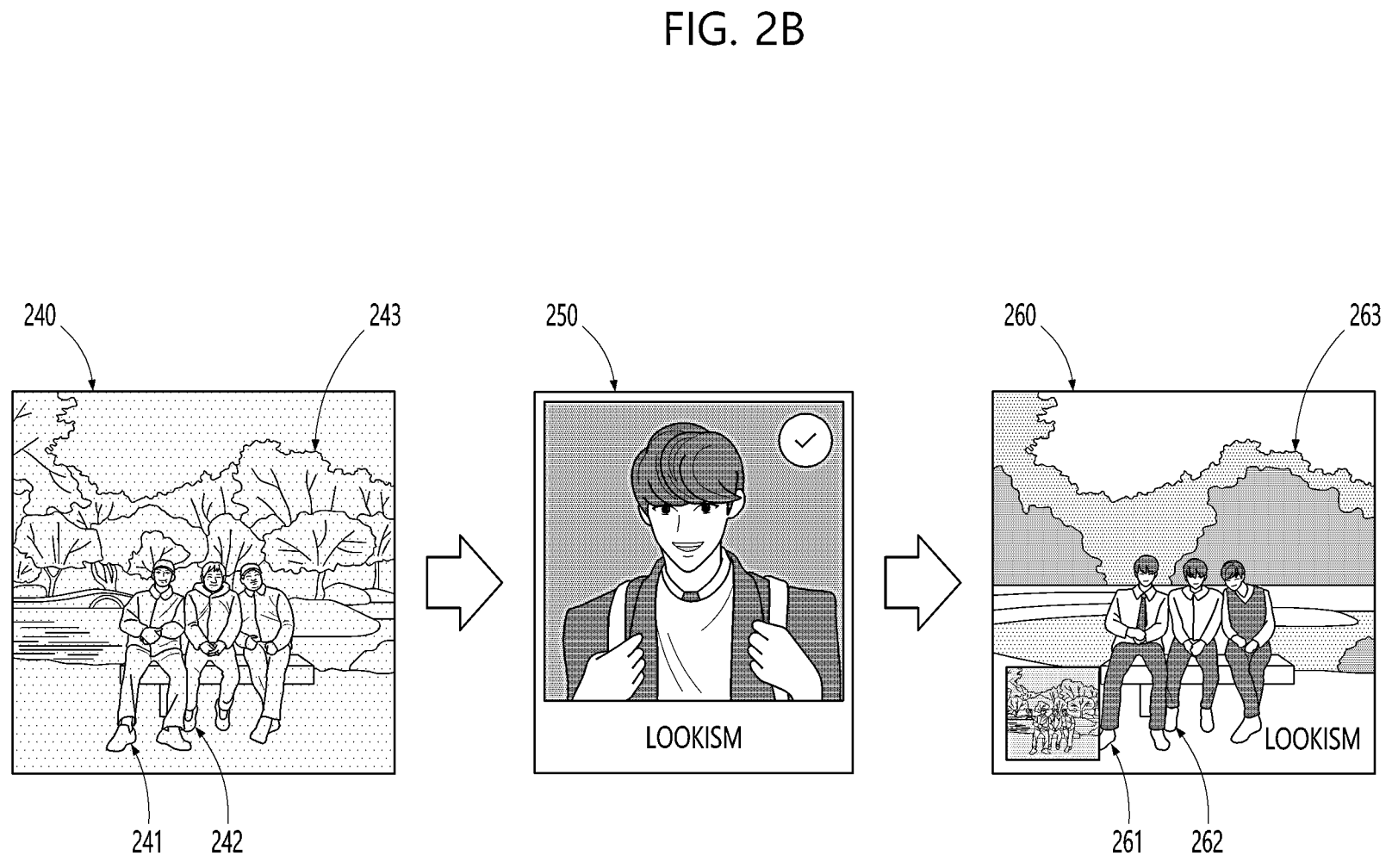
Figure 3:
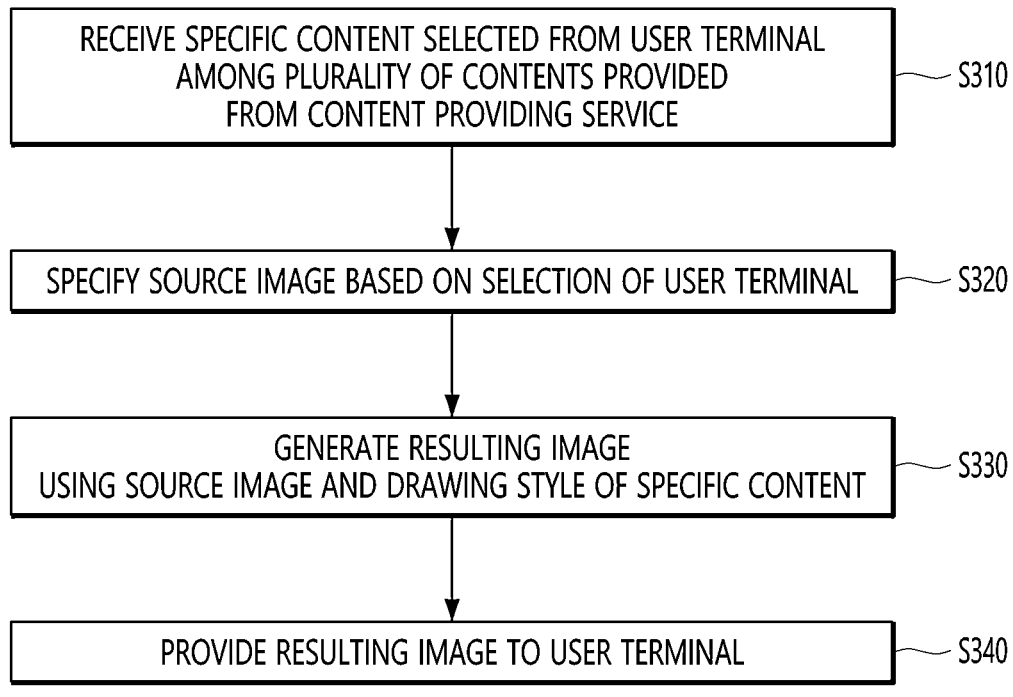
FIG. 3 is a flowchart for describing a method of generating an image according to the present invention.
Figure 7:
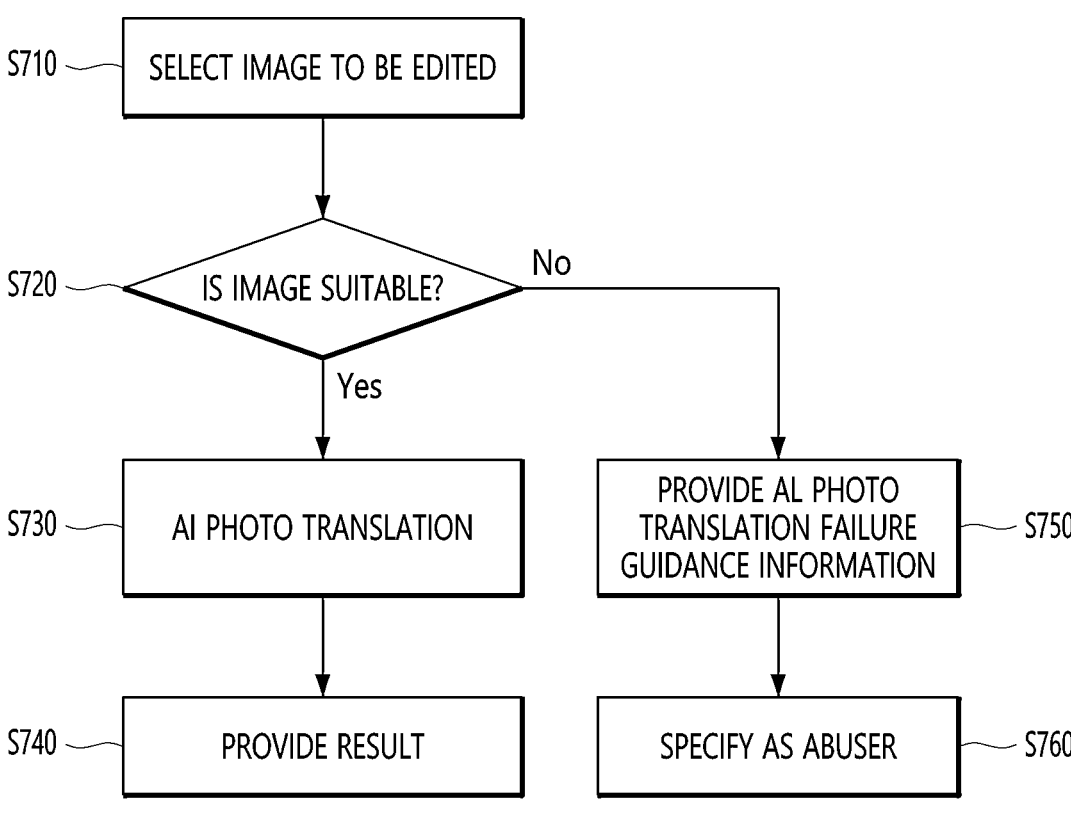
FIGS. 7 and 8 are flowcharts for describing a method of filtering harmful images.
Figure 8:
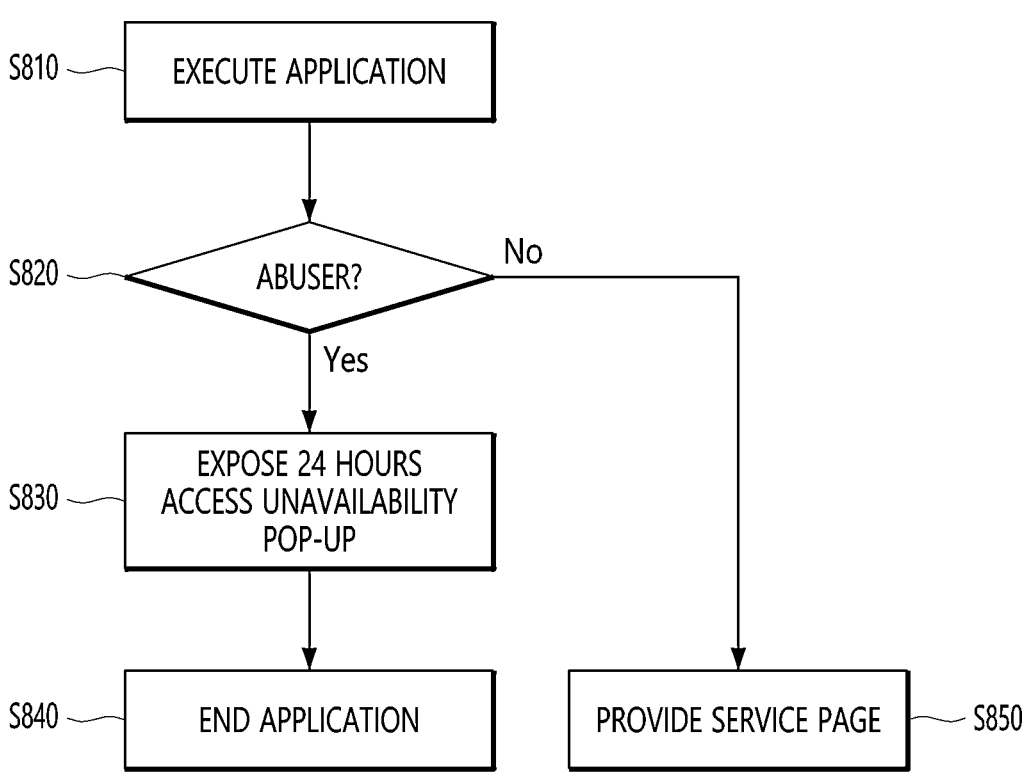

Hereinafter, a system and a method for generating images will be described in detail with reference to the accompanying drawings. FIG. 1 is a diagram for describing a system for generating an image according to the present invention. FIGS. 2A and 2B are diagrams for describing a source image, a target image, and a resulting image according to the present invention, FIG. 3 is a flowchart for describing a method of generating an image according to the present invention, FIGS. 4A, 4B, 4C, 4D, 5A, 5B, 5C, 5D, 5E, and 6 are diagrams for describing an image generating service, and FIGS. 7 and 8 are flowcharts for describing a method of filtering harmful images.

As illustrated in FIG. 1, a system 100 for generating an image according to the present invention may include at least one of a communication unit 110, a storage unit 120, and a control unit 130.

The communication unit 110 may perform wired or wireless communication with at least one of a user terminal 10 and a content server 100a to provide a service that generates and provides images.

Here, the user terminal 10 refers to an electrical device used by a user, and the type of the electrical device is not particularly limited as long as the electrical device may provide the images generated in the present invention. For example, the user terminal 10 may be a mobile phone, a smart phone, a notebook computer, a laptop computer, a slate PC, a tablet PC, an ultra-book, a desktop computer, a digital broadcasting terminal, a personal digital assistants (PDA), a portable multimedia player (PMP), a navigation system, a wearable device (e.g., a smart watch, a smart glass, or a head mounted display (HMD)), or the like.

The content server 100a can be understood as being a computer server for providing a content providing service and may be present in a separate space from the system 100 for generating the image. A plurality of contents may be stored and present in the content server 100a, and a content requested to be viewed from a user (or the user terminal 10) may be provided to the user terminal 10.

The content server 100a may provide a service that translates an image based on a drawing style of the content provided through the content providing service and provides the translated image, and this function may be performed by the system 100 for generating the image according to the present invention. The system 100 for generating the image according to the present invention can be understood as a component of the content server 100*a*. Therefore, the system 100 for generating the image described in the present invention can also be referred to as a content providing system according to the content server 100*a*.

The storage unit 120 may store various pieces of information for providing an image generating service.

Feature information of the drawing style of the content may be stored and present in the storage unit 120.

As described above, here, "drawing style" may refer to a drawing format of a content (in particular, a webcomic content), an author's unique drawing method, drawing style, that is, a visual feature (visual exterior). For example, a drawing style can be defined by sketches, drawings, paintings, textures, shapes, aspect ratios, exteriors, appearances, colors, clarity, color temperatures, noises, render, sharpen, and the like of graphic objects (people, animals, objects, backgrounds, landscapes, letters, and the like) included in the content. In the present invention, a drawing style can be referred to as a painting style, cartoon style, and the like.

The content, episode, scene image, and feature information of each of graphic objects (e.g., characters, backgrounds, and objects) included in the content may be stored and present in the storage unit 120.

For example, drawing style feature information of the graphic objects corresponding to each of characters (e.g., characters such as main characters, supporting characters), backgrounds (e.g., sky, schools, classrooms, houses, parks, department stores, and buses), and objects (e.g., trees, sun, cloud, desks, chairs, and computers) constituting a specific content of the graphic object may be present in the specific content by being matched.

As another example, feature information of the graphic objects constituting each of a first episode and second episode may be present by being matched in the first episode and second episode constituting the specific content of the graphic object (e.g., when an author's drawing style is changed, feature information matched with the first episode may differ from feature information matched with the second episode).

As still another example, feature information of graphic objects corresponding to each of Character A and Character B may be present by being matched in Character A and Character B appearing in a specific content (e.g., when the author draws Character A and Character B in different ways, feature information matched with Character A may differ from feature information matched with Character B).

The control unit 130 may perform a series of controls related to image generation, including control of the communication unit 110 and the storage unit 120.

The control unit 130 may provide a service page 1000 to the user terminal 10. The service page 1000 can be understood as a page linked to the image generating service (or the content providing service). The service page 1000 can be referred to as "screen."

The control unit 130 may specify an image which is the basis of image generation (or image translation) through the service page 1000. In addition, the control unit 130 may translate a drawing style of a specific image and provide the translated drawing style to a user.

In this case, the control unit 130 may translate the drawing style of the image based on an image generation model 100*b* trained to generate an image using a drawing style of a content. The image generation model 100*b* is an artificial intelligence model which translates a drawing style of an image based on data training, and for example, the control unit 130 may use the image generation model 100*b* provided by a Stable Diffusion AI.

In the present invention, the image which is the basis of image generation (or image translation) can be referred to as "source image." The source image is an image to be translated and can be understood as an original image.

As illustrated in FIG. 2A, a source image 210 may include at least one graphic object (e.g., a person image 211), and the control unit 130 may reflect a drawing style of a specific content 220 in the graphic object 211 and generate a resulting image 230.

The graphic object 211 included in the source image can be understood as images of various objects, such as people, animals, cars, flowers, bags, mountains, etc.

In the specification, for convenience of description, the graphic object 211 included in the source image 210 will be referred to as "first graphic object," and graphic objects 231*a*, 232*a*, and 233*a* included in the resulting image 230 will be referred to as "third graphic object." In addition, the graphic object included in the specific content 220 is referred to as "second graphic object."

The image and the graphic object included in the image are used in the same sense, and the drawing style (or the visual style) of the image may refer to the drawing style (or the visual style) of the graphic object. For example, the drawing style of the specific content 220 can be understood as referring to the drawing style of the second graphic object included in the specific content 220.

When the source image 240, illustrated in FIG. 2B, includes a plurality of graphic objects, the control unit 130 may reflect the drawing style of the specific content 250 in each of the plurality of graphic objects and generate a resulting image 260.

For example, when the source image 240 includes the plurality of graphic objects (e.g., a first person graphic object 241, a second person graphic object 242, and a background graphic object 243, the control unit 130 may translate the plurality of first graphic objects 241, 242, 243 to have the drawing style of the specific content 250 and generate the resulting image 260 including a plurality of third graphic objects 261, 262, 263 of which drawing styles have been translated.

Furthermore, the control unit 130 may translate the first graphic objects included in the source image into the drawing style of the content regardless of the type (or the object type) of the first graphic object included in the source image. For example, the type of the first graphic object may include person, animal, background (landscape), object, font, animation effect, and the like.

As illustrated in FIG. 2A, the control unit 130 may generate a plurality of different resulting images 231, 232, 233 using the same source image 210 and the drawing style of the specific content 230.

As described above, a plurality of characters may appear in the specific content. The control unit 130 may translate the first graphic object (the person graphic object 211) included in the source image 210 to have a drawing style of each of the plurality of characters appearing in the specific content or a drawing style of each of a plurality of episodes constituting the specific content.

For example, the control unit 130 may generate the first resulting image 231 by translating the same person graphic object 211 to have a drawing style of a first character of the specific content 220, generate the second resulting image 232 by translating the person graphic object 211 to have a drawing style of a second character, and generate the third resulting image 233 by translating the person graphic object 211 to have a drawing style of a third character.

As another example, the control unit 130 may generate the first resulting image 231 by translating the same person graphic object 211 to have a drawing style of a first episode of the specific content 220, generate the second resulting image 232 by translating the person graphic object 211 to have a drawing style of a second episode, and generate the third resulting image 233 by translating the person graphic object 211 to have a drawing style of a third episode.

Hereinafter, the image generating service that generates the image with the translated drawing style based on the content provided by the content providing service will be described in more detail.

Referring to FIG. 3, a process of selecting a specific content among a plurality of contents provided from the content providing service by the user terminal may be performed (S310).

In order to allow the user terminal 10 to select a specific content, the control unit 130 may display content information of at least some of the plurality of contents provided from the content providing service on the service page 1000.

Figure 4A:
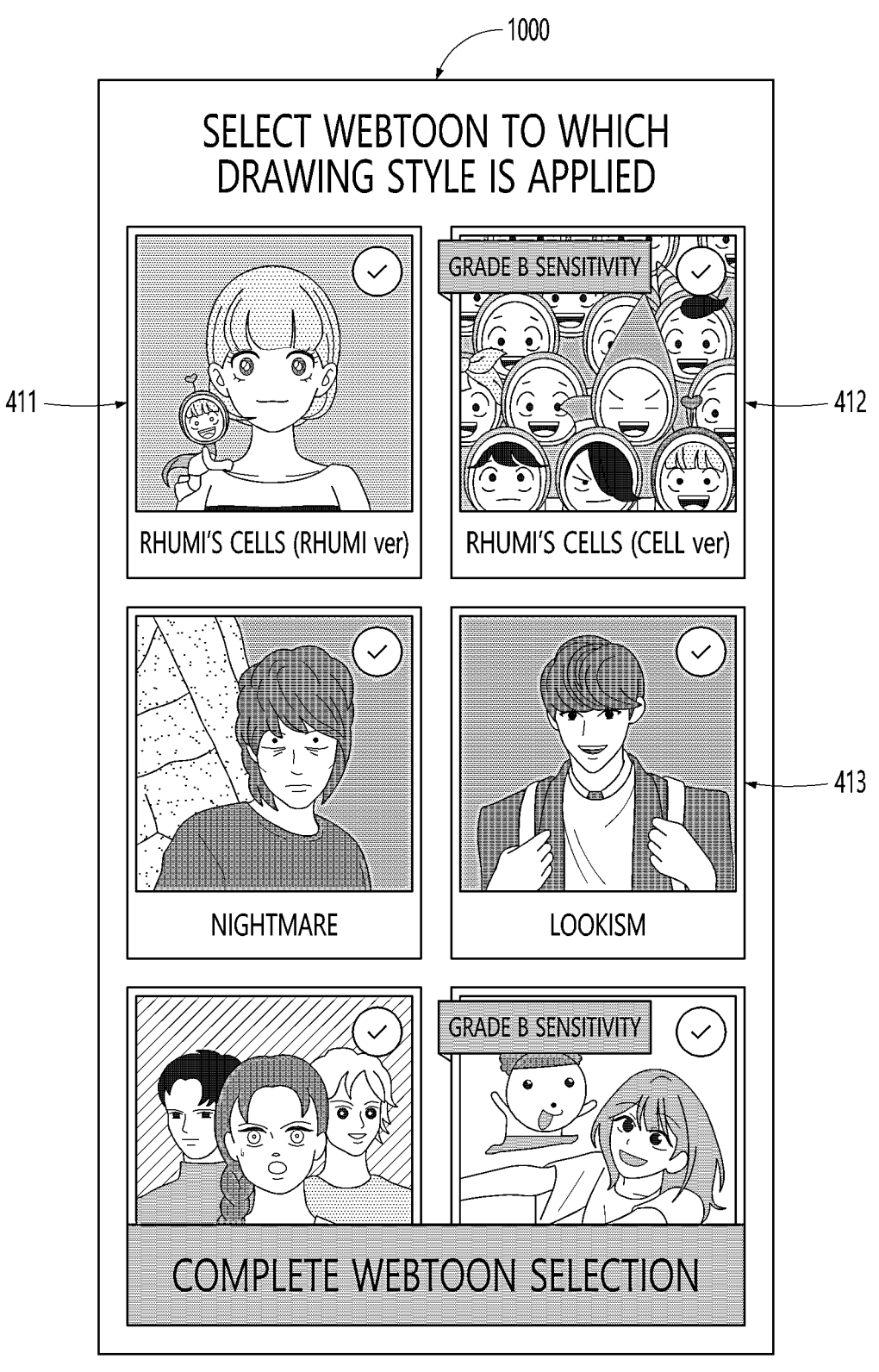

The content information may be diverse. For example, as illustrated in FIG. 4A, the control unit 130 may display content information 411, 412, 413 including at least one of a thumbnail and title (can be referred to as a content title or a work name) corresponding to each of the plurality of contents on the service page 1000.

The user may select the content information of the content with a drawing style to be applied to the source image.

The control unit 130 may specify a content corresponding to the content information selected by the user as a content to be used for the image generating service.

The control unit 130 may activate an icon (e.g., "complete webcomic selection") linked with an image generating service progress function based on at least one piece of content information being selected from the service page 1000.

In the present invention, a process of specifying a source image based on the selection of the user terminal may be performed (S320).

At this time, in operation S320, one or more images may be selected as the source image, and for convenience of description, the following description will be made based on the assumption that one image has been selected.

As described above, "source image" is the image which is the basis of image generation (or image translation) and can be referred to as "original image," "image to be translated," "image to be edited," or the like.

The control unit 130 may receive the source image selected in various ways. For example, the control unit 130 may display items corresponding to selectable images on the service page 1000. These selectable images may be images stored in the user terminal 10 or at least one external storage (or a cloud storage). In addition, the source image may include an image captured directly by the user, an image captured or generated by the third party, an imaged downloaded from the at least one external storage, an image (e.g., a sample image) provided from the image generating service, and the like, and the type thereof is not limited.

In the present invention, for convenience of description, the source image is described as "image," but a video may be used as a service target. Therefore, the image described in the present invention can be understood as an "image," but the service target can be a video. Therefore, it can be understood as a video.

The control unit 150 may receive a selection signal for at least one of items corresponding to each of selectable images output on the service page 1000. A selection input corresponding to the selection signal may be made through the user terminal 10 from which the service page 1000 is output. Based on the selection signal being received, the control unit 130 may specify an image corresponding to the item corresponding to the received selection signal as the source image.

Figure 4B:
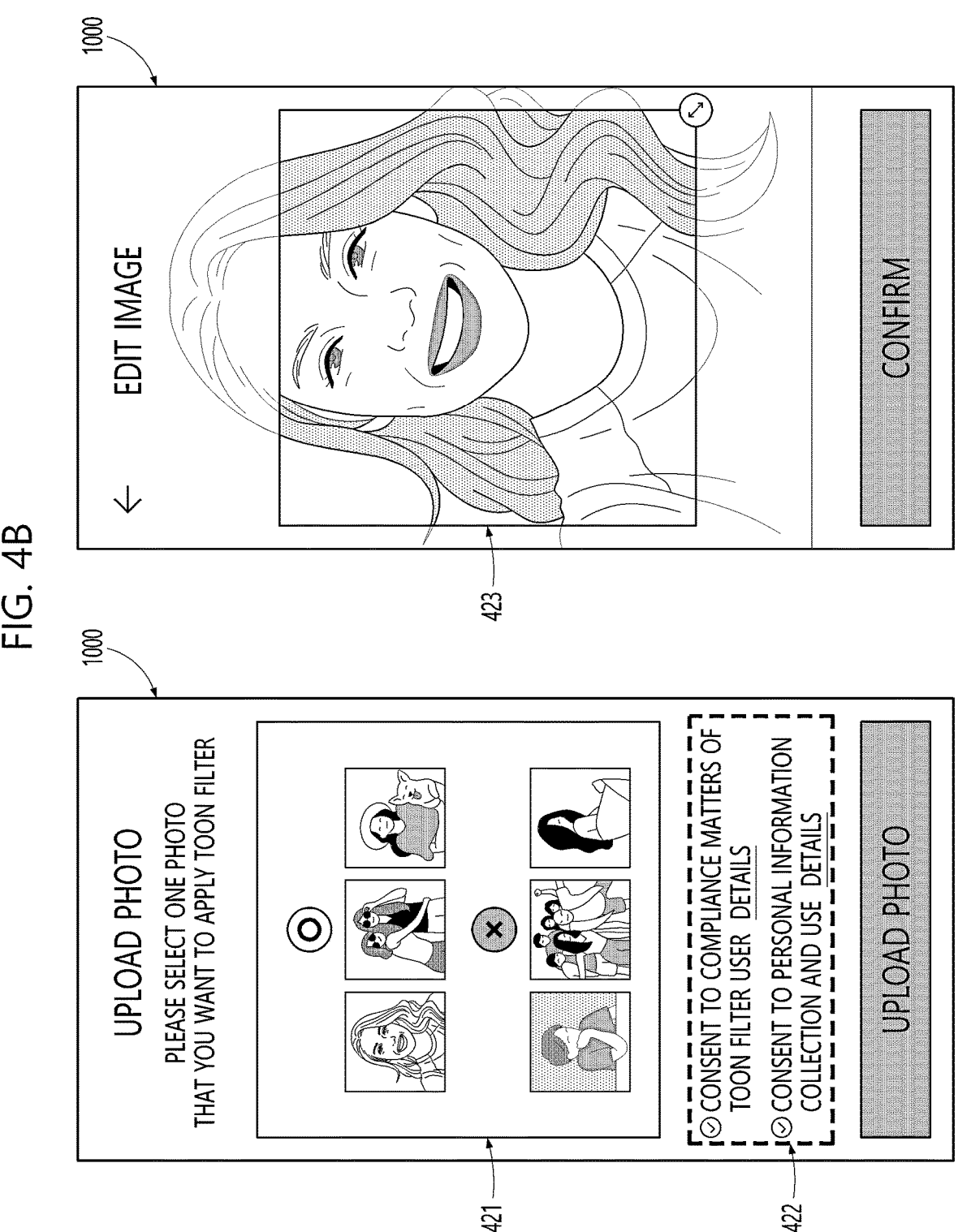

The control unit 130 may receive consent information for service use from the user terminal 10 before or after the source image is selected. For example, as illustrated in FIG. 4B, the control unit 130 may display guidance information 421 guiding compliant matters (e.g., restriction to the use of harmful images) for the use of the image generating service on the service page 1000. In addition, the control unit 130 may receive the user's consent information about compliance matters (or information about consent to collection and use of personal information) based on the user's input into one area 422 of the service page 1000.

In the present invention, the size of the source image may be preset. As illustrated in FIG. 4B, the control unit 130 may provide an image editing function 423 (e.g., a box image corresponding to a preset size and a crop tool) of editing the size of the selected source image to the preset size (can be referred to as "resizing") based on when the source image is selected. The user may edit the source image to the preset size using the editing function.

In the present invention, a process of generating the resulting image using the source image and the drawing style of the specific content may be performed (S330).

As described above, the control unit 130 may generate the resulting image obtained by changing the drawing style of the source image based on the image generation model 100b trained to generate the image using the drawing style of the content. For example, based on a Stable Diffusion AI technology, the control unit 130 may generate the resulting image obtained by changing the drawing style of the source image into the drawing style of specific content.

In this case, the control unit 130 may generate the resulting image based on drawing styles of at least some of the plurality of graphic objects included in the specific content. In the present invention, the drawing style used to generate the resulting image among the drawing styles related to the specific content can be referred to as "target drawing style" (or drawing style of the target graphic object).

The control unit 130 may specify the target drawing style based on the user selection. For example, the control unit 130 may receive the user selection for at least some of a plurality of episodes constituting the specific content through the service page 1000. The control unit 130 may specify the drawing styles of the graphic objects included in the selected episode as the target drawing style (the graphic objects included in the selected episode can also be referred to as the target graphic object). In addition, the control unit 130 may generate the resulting image by translating the drawing style of the source image into the target drawing style. In this case, based on when the drawing styles of the selected episodes (i.e., the specified target drawing styles) differ from each other, the control unit 130 may generate the resulting image by translating the drawing style of the source image into different drawing style even in the case of the same source image. More specifically, for the same source image, the control unit 130 may generate the resulting images with different drawing styles depending on which the resulting image is generated by using any one of the drawing style corresponding to the first episode and the drawing style corresponding to the second episode. A web-comic content may be generated by an author's drawing, and since the author's drawing style may be changed during serialization, the drawing style of the first episode serialized in the beginning may differ from the drawing style of the second episode serialized in the latter part. Therefore, in the present invention, different resulting images may be generated depending on which drawing style of the episode among the plurality of episodes constituting the specific content is applied.

As another example, the control unit 130 may receive the user selection for at least some of a plurality of characters appearing in the specific content through the service page 1000. The control unit 130 may generate a resulting image by translating the drawing style of the source image into a drawing style of the selected character. In this case, based on when the drawing styles of the selected characters (i.e., the specified target drawing styles) differ from each other, the control unit 130 may generate the resulting image by translating the drawing style of the source image into different drawing style even in the case of the same source image. More specifically, it is assumed that Character A appearing in the specific content has a "black" hairstyle, and Character B different from Character A has a "red" hairstyle. When the drawing style of Character A is applied to the person graphic object included in the source image, the control unit 130 may generate a resulting image by changing the drawing style of the person graphic object into a drawing style with the "black" hairstyle. On the other hand, when a drawing style of Character B is applied to the same person graphic object, the control unit 130 may generate a resulting image by changing the drawing style of the person graphic object into a drawing style with the "red" hairstyle.

As still another example, the control unit 130 may determine that the drawing style of the specific character included in the selected specific episode is the target drawing style based on the drawing style of the specific character (e.g., Character A) appearing in the specific episode (e.g., the first episode) among the plurality of episodes constituting the specific content.

According to one embodiment, the control unit 130 may change the drawing style of a first graphic object based on the drawing style of a second graphic object with the same object type as that of the graphic object (hereinafter referred to as "first graphic object) included in the source image among the plurality of graphic objects (hereinafter referred to as "second graphic object") included in the specific content.

For example, when the source image includes the first graphic object corresponding to a "person" type, the control unit 130 may change the drawing style of the first graphic object into the drawing style of the second graphic object corresponding to an appearing person character type in the specific content. On the other hand, when the source image includes the first graphic object corresponding to a "background" type, the control unit 130 may change the drawing style of the first graphic object into the drawing style corresponding to the "background" type in the specific content.

In this case, the control unit 130 may specify the object type of the graphic object additionally in consideration of attribute information of the object type. For example, the control unit 130 may specify the second graphic object corresponding to the first graphic object in consideration of the person's gender, age, occupation, appearance style (e.g., a "short cut," "short hair," or "long hair" hairstyle), whether the background is a building, outdoor, or indoor, and the like and specify the drawing style of the specified second graphic object as the target drawing style.

In other words, when the same source image includes a plurality of graphic objects with different object types, the control unit 130 may specify the target drawing style for each of the plurality of graphic objects and perform the drawing style translation. The resulting image may include a plurality of graphic objects to which different drawing styles are applied.

As yet another example, the control unit 130 may specify a target drawing style to be applied to each of the plurality of person graphic objects based on positions (or relative positions) of the plurality of person graphic objects included in the source image. Character information corresponding to each position of the person graphic objects may be present in the storage unit 120. For example, when the source image includes three person graphic objects as illustrated in FIG. 2B, the control unit 130 may specify the target drawing style of the person graphic object 242 positioned at the center as the drawing style of the first character (e.g., a leading character or main character) of the specific content and specify the target drawing style of the person graphic object 241 positioned at the side as the drawing style of the second character (e.g., a supporting character) which differs from the first character.

According to another embodiment, as illustrated in FIG. 4C, the control unit 130 may generate a composite image 430 using a resulting image 431, a source image 432 (or an original image), and title information 433 (or a work name) of a specific content. In this case, the control unit 130 may generate the composite image 430 by combing (or overlapping) the source image 432 with the title information 433 in one area of the resulting image 431.

Furthermore, the control unit 130 may calculate time information required to generate the resulting image. In this case, in order to generate the resulting image, the control unit 130 may predict and calculate the time information required to generate the resulting image based on when the service page provided to the user terminal is changed (or when a resulting image generation request is received from the user terminal).

As illustrated in FIG. 4C, the control unit 130 may provide the service page 1000 with guidance information (e.g., "You can see the result in 10 seconds! An error may occur if you leave the screen so please wait a moment.") including the calculated time information 434 (e.g., "10 seconds"). In addition, the control unit 130 can prevent the user from leaving the service page 1000 while the resulting image is being generated by providing the image object 435 (e.g., a loading bar) corresponding to the time information on the service page 1000.

In the present invention, a process of providing the resulting image to the user terminal may be performed (S330).

Figure 4D:
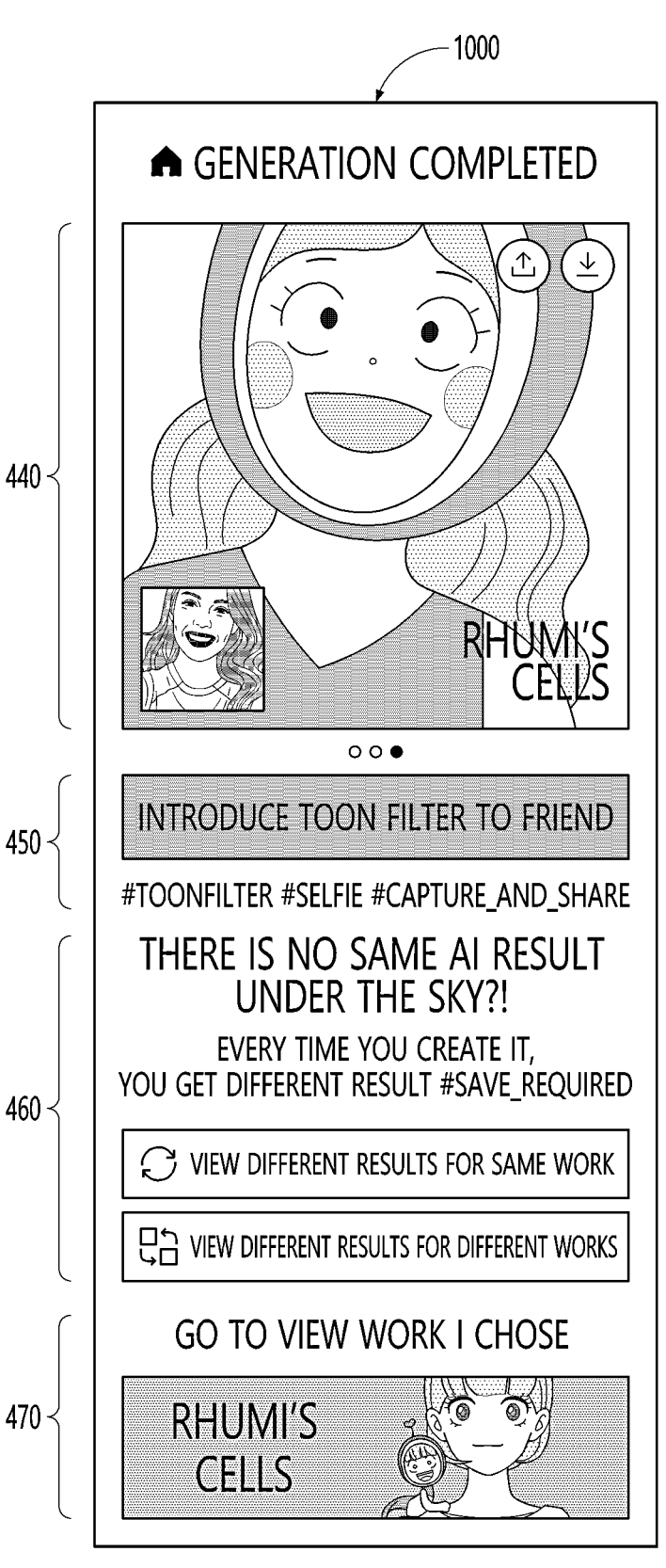

As illustrated in FIG. 4D, based on when the generation of the resulting image is finished, the control unit 130 may provide the resulting image to at least one area 440 of the service page 1000. As described above, the control unit 130 may generate the plurality of different resulting images based on one source image. In a state in which any one of the plurality of resulting images is being displayed in the one area 440, the control unit 130 may provide an additional resulting image, which differs from the resulting image currently being displayed, in the one area 440 at the same time based on a preset user input method (e.g., swipe) in the one area 440.

In the present invention, the image generating service may be provided to encourage the user's interest in the content and lead the user's interest in the content to content consumption. Therefore, according to the present invention, it is possible to provide various functions for encouraging users to consume contents while providing the resulting images on the service page 1000.

As illustrated in FIG. 4D, the service page 1000 may include a plurality of areas 440, 450, 460, 470. The resulting image providing function may be provided in the first area 440 among the plurality of areas. An image generating service sharing function may be provided in a second area 450, an image re-generating function may be provided in a third area 460, and a specific content use function may be provided in a fourth area 470. Hereinafter, the functions provided in the first to fourth areas 440 to 470 will be described in detail.

The control unit 130 may generate and provide the resulting images with different visual exteriors for the same source image.

As described above, the control unit 130 may specify (or determine) the target drawing style based on the drawing styles of at least some of the plurality of graphic objects included in the specific content.

For example, the control unit 130 may specify the target drawing style based on all of the plurality of graphic objects included in the specific content. As another example, the control unit 130 may specify a target drawing based on a graphic object included in at least some (e.g., the first episode) of the plurality of episodes. As still another example, the control unit 130 may specify a target drawing style based on a drawing style of a specific character (e.g., a leading character) among characters appearing in the specific content. As yet another example, the control unit 130 may specify a target drawing style based on a drawing style of a graphic object of a specify object type (e.g., a building, flower, or tree).

As described above, the control unit 130 may specify various target drawing styles based on the specific content. The control unit 130 may generate resulting images with different drawing styles (or visual exteriors or visual features) based on whether any one of a first drawing style and second drawing style of the specific content is specified as the target drawing style. Therefore, the control unit 130 may provide a new resulting image to which the second drawing style which differs from the first drawing style is applied in a state in which the resulting image to which the first drawing style is applied is provided.

Figure 5A:
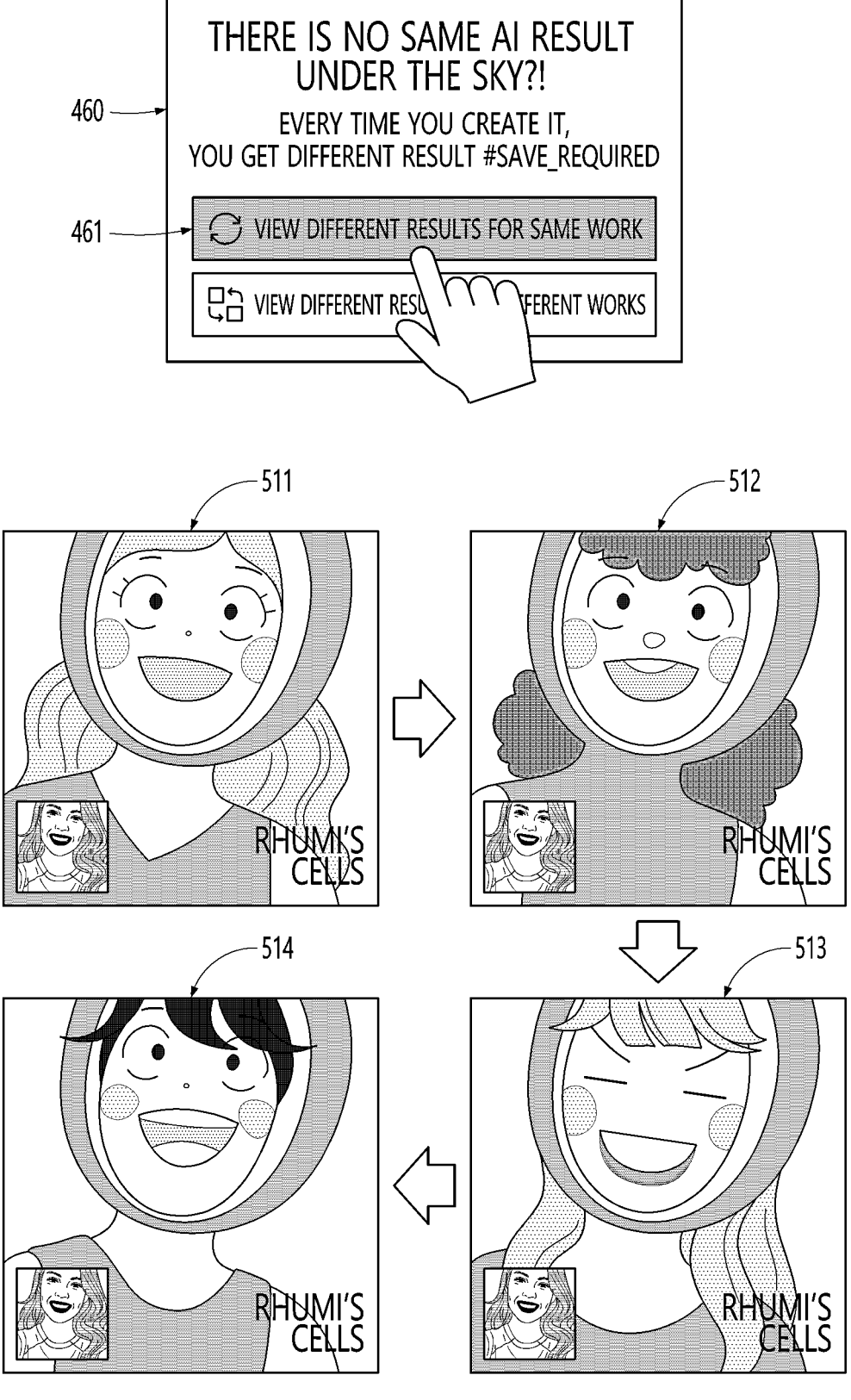

As illustrated in FIG. 5A, the control unit 130 may provide a first functional icon 461 (e.g., "view different results for the same work") to the specific area 460 (e.g., the third area) of the service page 1000 together with the resulting image. Based on when the first functional icon 461 is selected, the control unit 130 may provide a second resulting image with a drawing style (or visual exterior or visual feature) which differs from a previously provided first resulting image using the same source image and the same specific content.

More specifically, the control unit 130 may provide the first resulting image with the first drawing style based on when the first drawing style of the specific content is specified as the target drawing style. The control unit 130 may specify the second drawing style of the specific content as the target drawing style based on when the first functional icon 461 is selected in the state in which the first resulting image is provided. In addition, the control unit 130 may generate the second resulting image with the second drawing style and provide the second resulting image to the user terminal 10.

Whenever there is a request from the user terminal 10 to provide new resulting images using the same source image and the same specific content, the control unit 130 may re-specify a drawing style which differs from the previously specified drawing style as the target drawing style and provide the new resulting image to which the re-specified target drawing style is applied to the user terminal 10. For example, as illustrated in FIG. 5A, a first resulting image to a fourth resulting image 511 to 514 to which the first drawing style to a fourth drawing style of the specific content are applied may be sequentially provided to the user terminal 10.

As described above, in the present invention, information about the content provided to the image generating service may be exposed to the user together with the resulting image to encourage the user's use of the image generating service to lead to the use (viewing or watching) of the content.

Meanwhile, the control unit 130 may monitor the user selection which selects information about the specific content in the state in which the resulting image is provided on the service page 1000.

More specifically, the control unit 130 may collect a click event for the specific content. In a state in which a session for the click event is activated, the control unit 130 may monitor whether a preset action (e.g., viewing a content, viewing a free episode, viewing a paid episode, or the purchase of an electronic money used for viewing the content) has been performed in connection with the click event. The control unit 130 may calculate user introduction data (e.g., the number of times a user views a content using an image generating service) using the click event for the specific content information and the monitoring result.

According to another embodiment, the control unit 130 may generate a resulting image by applying a drawing style of a second content which differs from a pre-specified first content to the same source image. A drawing style of the first content may differ from that of the second content. The control unit 130 may apply drawing styles of various contents to the same source image and provide the drawing styles of various contents to the user.

Figure 5B:
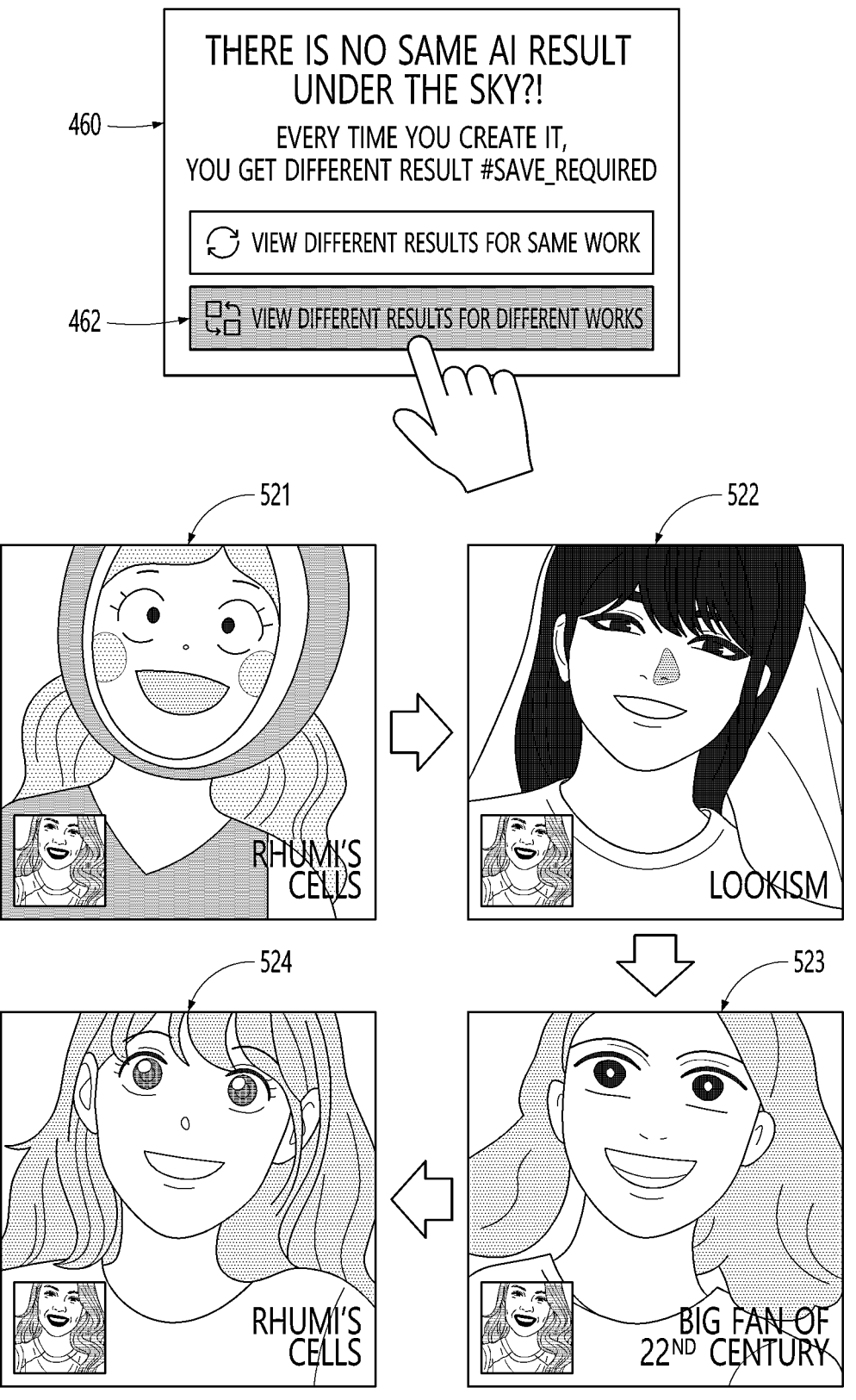

As illustrated in FIG. 5B, the control unit 130 may provide a second functional icon 462 (e.g., "view different results for different works") to the specific area 460 (e.g., the third area) of the service page 1000 together with the resulting image. The control unit 130 may determine (specify) a content which differs from the pre-specified content as the specific content based on when the second functional icon 462 is selected. For example, when the second functional icon 462 is selected, the control unit 130 may display content information of at least some of the plurality of contents provided from the content providing service on the service page 1000 (see FIG. 4A). The control unit 130 may determine a content corresponding to the content information selected from the service page 1000 as the specific content.

When the second content which differs from the first content is re-specified in the state in which the first content is specified, the control unit 130 may determine a drawing style of the second content as the target drawing style. The control unit 130 may generate the second resulting image which differs from the previously provided first resulting image by applying the drawing style of the second content determined to be the target drawing style to the source image.

The control unit 130 may generate resulting images with drawing styles of different contents whenever the different contents are specified for the same source image and provide the resulting images to the user terminal 10. For example, as illustrated in FIG. 5B, based on when each of the first content to a fourth content are specified, the control unit 130 may sequentially provide the user terminal 10 with the first resulting image to the fourth resulting image 511 to 514 to which the drawing style of each of the first content to the fourth content is applied.

According to another embodiment, the control unit 130 may provide a function of landing to the service page 1000 (e.g., can be referred to as "content page") the specific content to the one area 470 (e.g., the fourth area) of the service page 1000 together with the resulting image.

As illustrated in FIG. 5C, the control unit 130 may provide information (e.g., a banner) about the specific content to the fourth area 470. The information about the specific content may be configured to be linked to the content page of the specific content.

As illustrated in FIG. 5C, the control unit 130 may provide the service page 1000 providing the specific content to the user terminal 10 based on when the information (e.g., a banner) about the specific content included in the fourth area 470 is selected. The service page 1000 providing the specific content may include an episode list 530 including episode items 531 to 536 corresponding to the plurality of episodes included in the specific content. The control unit 130 may provide the user terminal 10 with an episode corresponding to a selected item based on the user selection for the specific episode item.

Although not illustrated, when the target drawing style is specified based on the specific episode among the plurality of episodes, the control unit 130 may display the information about the specific episode on the service page 1000 providing the content. For example, when the target drawing style is determined based on the first episode (e.g., Episode 1) among the plurality of episodes, the control unit 130 may display information indicating the episode corresponding to the target drawing style of the resulting image on the episode item 531 corresponding to the first episode.

When the content used for the image generating service is changed into a different content from the specific content, the control unit 130 may display and provide information about the different content together with a resulting image generated by using a drawing style of the different content on the service page 1000. Based on when the information about the different content is selected, the control unit 130 may provide the user terminal with a service page (content page including an episode list of the plurality of episodes constituting the different content) matched with the different content.

Figure 5D:
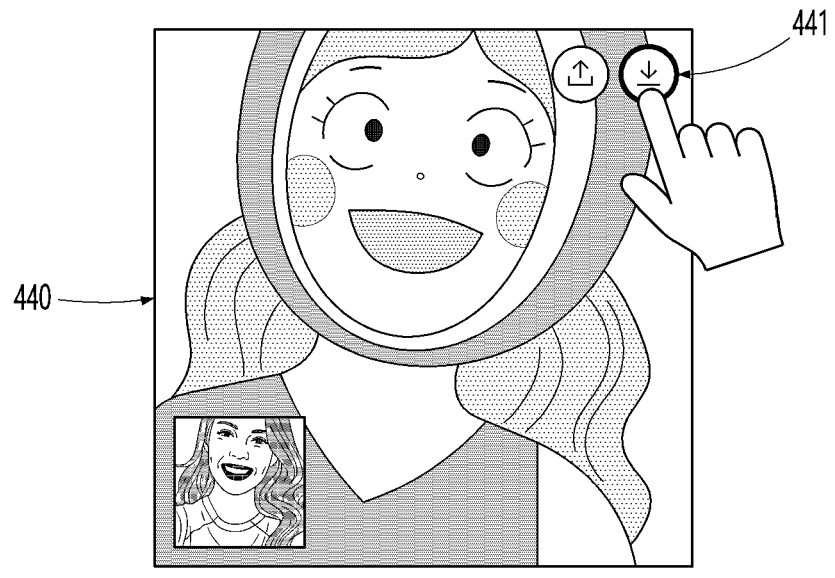
Figure 5D:

As illustrated in FIG. 5D, the control unit 130 may provide a storage icon 441 linked to a resulting image storage function to the one area 440 (first area) of the service page 1000 from which the resulting image is provided.

Based on when the storage icon 441 is selected, the control unit 130 may store at least some of the resulting images in the user terminal 10. More specifically, based on when the storage icon 441 is selected, the control unit 130 may provide the user terminal 10 with a plurality of storage option items 541, 542, and 543 ("Save only this image," "Save all images," and "Save as a gif file"). Based on when any one of the plurality of option items 541, 542, and 543 is selected, the control unit 130 may store an image (or a file in a corresponding format) corresponding to the selected item in the user terminal 10.

As described above, the control unit 130 may generate and provide a plurality of different resulting images. When the first option item 541 is selected, the control unit 130 may store only any one of the plurality of resulting images (e.g., the resulting image displayed in the first area) in the user terminal 10. In addition, when the second option item 542 is selected, the control unit 130 may store all of the plurality of resulting images in the user terminal 10. In addition, when the third option item 543 is selected, the control unit 130 may translate at least some of the plurality of resulting images into a specific format (e.g., gif) and store the translated resulting images in the user terminal 10.

Figure 5E:
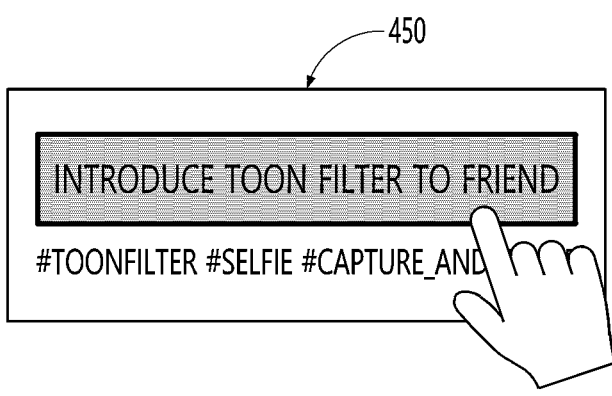
Figure 5E:
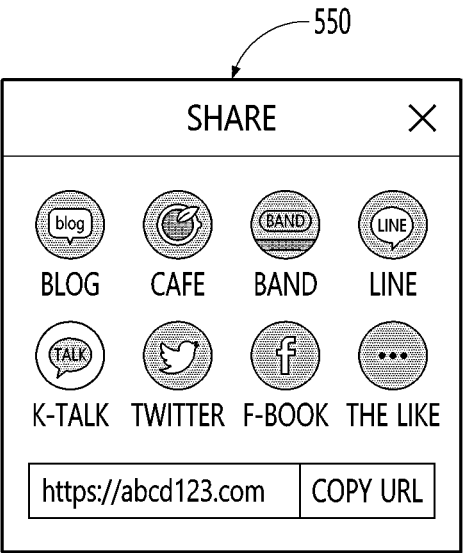

As illustrated in FIG. 5E, the control unit 130 may provide a sharing functional icon (e.g., "introduce a toon filter to a friend") of sharing the image generating service to the one area 450 (second area) of the service page 1000 on which the resulting image is provided.

The control unit 130 may provide a function of transmitting information about the image generating service to other users based on when the sharing functional icon is selected. For example, the control unit 130 may generate a deep link to the service page 1000 on which the image generating service (or the content providing service) is provided based on when the sharing functional icon is selected. The control unit 130 may provide a series of processes to provide the generated deep link to other users (see FIG. 5E, 550). The deep link can be defined as a function that helps launch an app and move to a specific page in the app.

As described above, in the present invention, by providing the image generating service based on the content, it is possible to encourage the user's interest in contents and lead the user's interest in consumption of contents or the introduction of new users.

Figures 6A, 6B, 6C, 6D:
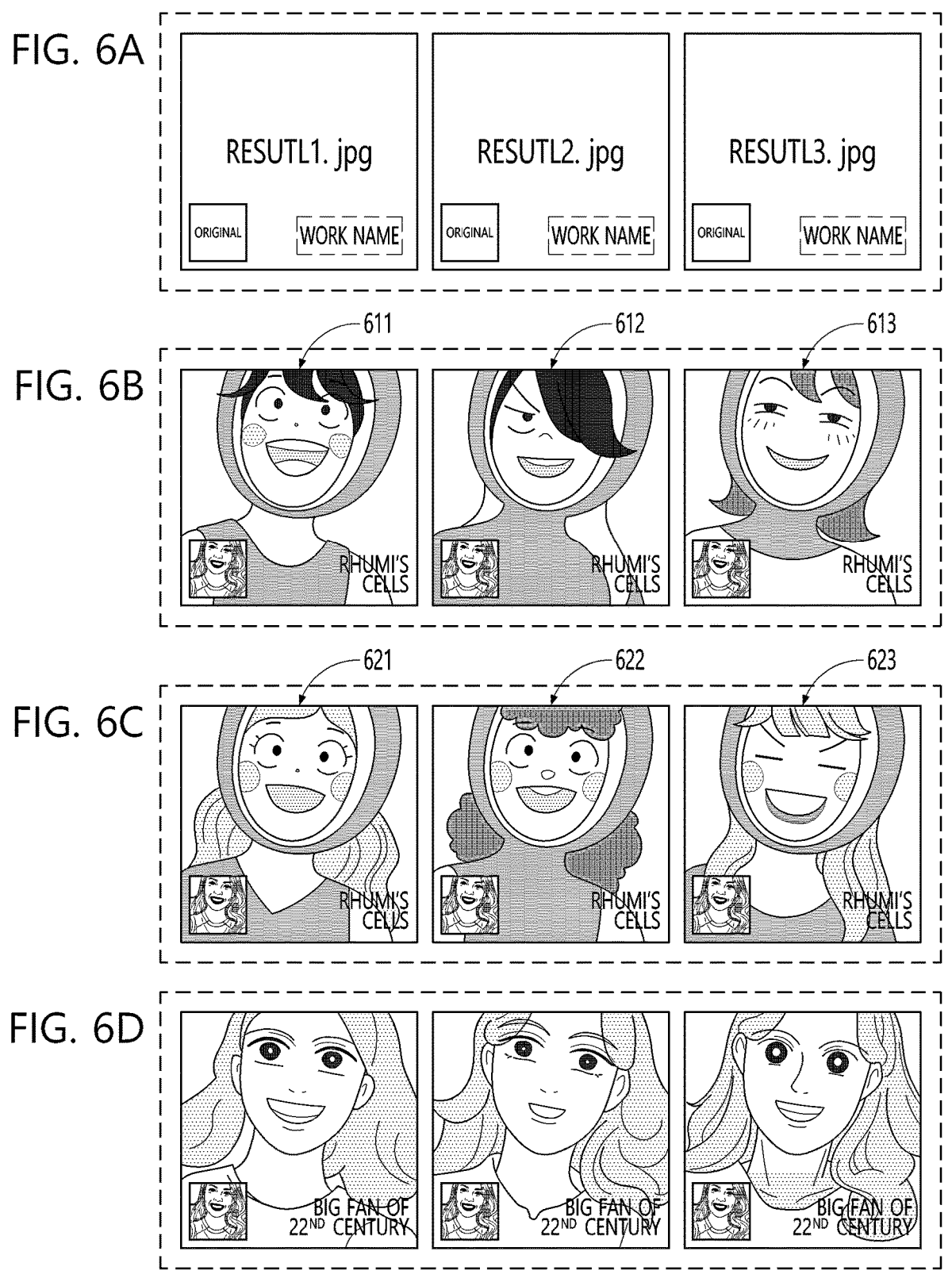

As illustrated in FIG. 6A, the control unit 130 may generate a plurality of different resulting images (or composite images) using the same source image and the same specific content. In other words, the control unit 130 may generate the plurality of different resulting images (or composite images) simultaneously based on when a request for the image generation is received from the user terminal 10. Hereinafter, for convenience of description, the plurality of resulting images generated together will be expressed as "image set."

The resulting images included in the same image set may be generated to have different visual exteriors. For example, as illustrated in FIG. 6B, a first resulting image to a third resulting image 611 to 613 included in a first image set may be generated by applying each of the first drawing style to the third drawing style to the same source image.

When there is a request from the user terminal 10 to generate new resulting images using the same source image and the same specific content, the control unit 130 may generate a second image set which differs from the first image set and provide the second image set to the user terminal 10. As illustrated in FIG. 6C, a fourth resulting image to a sixth resulting image 621 to 623 included in the second image set may have a visual exterior (or a drawing style) which differs from that of the previously generated resulting image. In other words, all of the resulting images 621 to 623 included in the second image set may differ from all of the resulting images 611 to 613 included in the first image set. As described above, even when the plurality of resulting images are generated at once, the control unit 130 may continuously generate and provide resulting images with new visual exteriors (or drawing styles).

Furthermore, as illustrated in FIG. 6D, when there is a request from the user terminal 10 to generate new resulting images using the same source image and different contents, the plurality of resulting images to which each of a first drawing style to a third drawing style of a different content is applied may be generated as image sets.

In the present invention, by performing image analysis on the source image of which the drawing style is changed by the user using the image generating service to filter harmful images (e.g., sensational images, violent images, hate images, and images which violate copyright), it is possible to restrict the service use of the harmful images.

The control unit 130 can restrict the service use of the harmful images by filtering harmful images among images selected by the user based on an artificial intelligence model trained based on training data. For example, the control unit 130 may use the artificial intelligence model trained based on a filtering technology such as "Xpider Four Image," "Deep Learning," or the like. The harmful image filtering artificial intelligence model may be present inside the system for generating the image (or the content server) or present in a separate external server. When the harmful image filtering artificial intelligence model is present in the external server, the control unit 130 may use the harmful image filtering artificial intelligence model by communicating with the external server. Hereinafter, for convenience of description, a method of filtering harmful images by the control unit 130 will be described. It goes without saying that the control unit 130 may filter the harmful images using the trained artificial intelligence model in order to filter the harmful images.

As illustrated in FIG. 7, the control unit 130 may receive an image to be edited selected from the user terminal 10 (S710). In other words, the control unit 130 may receive selection information specifying the source image from the user terminal 10.

The control unit 130 may perform image analysis on the selected source image and determine whether the source image is suitable for using the image generating service (S720).

More specifically, the control unit 130 may determine whether the source image is a harmful image and when the source image is not a harmful image, determine that the image is suitable for service use. When it is determined that the source image is an image suitable for service use based on when the source image is not a harmful image, the control unit 130 may generate a resulting image using the source image and a drawing style of a specific content. In other words, the control unit 130 may perform image translation (or AI photo translation) which translates a drawing style of the source image into the drawing style of the specific content (S730). In addition, the control unit 130 may provide the image generating service by providing the resulting image generated from the source image to the user terminal 10 (S740).

On the other hand, as a result of determining whether the source image is a harmful image, the control unit 130 may determine that the source image is an inappropriate image which is not suitable for service use based on when the source image corresponds to a harmful image. When it is determined that the source image is an image which is not suitable for service use based on when the source image is determined to be a harmful image, the control unit 130 may restrict the image generating service using the source image. More specifically, the control unit 130 may provide the user terminal 10 with guidance information (or AI photo translation failure guidance information, for example, "An inappropriate image is included. The sensational image cannot adopt the toon filter.") which guides the restriction to the service use (S750). In addition, the control unit 130 may specify a user (or a user account) who has selected the harmful image as a service use restricted user (abuser) (S760).

Here, "service use restricted user" can be understood as a user whose use of the service (at least one of the image generating service and the content providing service) provided in the present invention is restricted.

Based on when the user is specified as the service use restricted user, the control unit 130 may match the corresponding user's account and store use restricted information (or abuser information), which specifies that the corresponding user's service use is restricted, in the user information. In this case, the control unit 130 may match time information specified as the use restricted user with the user account and store the matching result in the storage unit 120.

The control unit 130 may restrict the service use of the service use restricted user in various ways. For example, the control unit 130 may restrict the service use in a manner of restricting the service use for a predetermined time.

As illustrated in FIG. 8, the control unit 130 may restrict the service use of the use restricted user based on when the service is executed (e.g., when the service page is executed or an application to which the service is provided is executed).

More specifically, when the service is executed (S810), the control unit 130 may check whether the user using the service is a use restricted user (abuser) (S820). The control unit 130 may check whether the corresponding user is a use restricted user (abuser) with reference to the user information matched to the user account. As a checking result, when the user corresponds to the use restricted user, the control unit 130 may provide the user terminal 10 with guidance information indicating the service use restriction (or guidance information indicating that the service is not available for a predetermined time (e.g., 24 hours), for example, "The inappropriate image have been detected as being uploaded so the use of the toon filter will be restricted for 24 hours") (S830). In addition, the control unit 130 may forcibly end the execution of the service (e.g., the provision of the service page is ended or the execution of the application is ended) (S840). On the other hand, as a checking result, when the user does not correspond to the use restricted user, the control unit 130 may provide the user terminal 10 with service page 1000 for service use (S850).

The control unit 130 may store at least one of the source image and the resulting image used in the image generating service in the storage unit 120.

When the image generating service is used in a state in which the user account is logged in to the user terminal 10, the control unit 130 may match the user account and store at least one of the source image and the resulting image.

The control unit 130 may control the source image and the resulting image to be temporarily stored in the storage unit 120. More specifically, the control unit 130 may delete the source image and resulting image stored in the storage unit 120 at a preset cycle. In addition, the control unit 130 may delete the source image and the resulting image based on when the source image and the resulting image have elapsed a predetermined time (e.g., 1 week) based on a time stored in the storage unit 120.

The method and the system for generating the image according to the present invention may provide the image generating service using the contents provided from the content providing service. More specifically, according to the present invention, specific contents and source images may be selected from user terminals. The users may receive resulting images obtained by translating drawing styles of the source images into the drawing styles of the specific contents only by selecting the specific contents.

Furthermore, the method and the system for generating the image according to the present invention may generate resulting images using the source images selected from user terminals and the drawing styles of the specific contents and provide the generated resulting images to the user terminals. The users may use contents in various ways by receiving resulting images in which source images desired by users have been converted into favorite picture forms of contents. In addition, content service providers can achieve users' continuous consumption of contents and the introduction of new users by attracting the users' interest in contents. The present invention can be implemented as a program which may be executed by one or more processors on a computer and stored in a medium (or a recording medium) which may be read by such a computer.

Furthermore, the present invention can be implemented as computer-readable codes or instructions on a program-recorded medium. In other words, the present invention may be provided in the form of a program.

The computer-readable medium includes any type of recording devices in which data which is readable by a computer system are stored. Examples of the computer-readable medium include a hard disk drive (HDD), a solid state disk (SSD), a silicon disk drive (SDD), a read only memory (ROM), a random access memory (RAM), a CD-ROM, a magnetic tape, a floppy disk, an optical data storage device, and the like.

Furthermore, the computer-readable medium may be a server or cloud storage which includes a storage and may be accessed by a user terminal through communication. In this case, the computer may download the program according to the present invention from a server or cloud storage through wired or wireless communication.

Furthermore, in the present invention, the above-described computer is a user terminal provided with a processor, that is, a central processing unit (CPU), and the type thereof is not particularly limited.

The above detailed description should not be construed as limiting in all respects and should be considered illustrative. The scope of the present invention should be determined by reasonable construction of the appended claims, and all changes within the equivalent scope of the present invention are included in the scope of the present invention.

What is claimed is:

1. A method of generating an image using a content provided from a content providing service, the method being performed by a processor and comprising:

receiving a specific content having a specific drawing style selected from a user terminal among a plurality of contents provided from the content providing service;

specifying a predetermined source image having an appearance that is to be edited based on the selected specific content;

generating a resulting image using the source image and the drawing style of the specific content; and providing the resulting image to the user terminal, wherein the resulting image is provided as a separate image from the specific content and has the appearance of the source image in the drawing style of the specific content.

2. The method of claim 1, wherein the specific content is composed of a plurality of episodes, and the drawing style of the specific content is specified based on a scene image included in at least one of the plurality of episodes.

3. The method of claim 2, wherein the resulting image is obtained by changing a graphic object included in the source image into the drawing style of the specific content.

4. The method of claim 3, wherein a person graphic object included in the source image is changed into at least one drawing style among a plurality of characters appearing in the specific content.

5. The method of claim 3, wherein the providing of the resulting image to the user terminal includes providing the user terminal with a service page including the resulting image and information about the specific content, and based on when the information about the specific content is selected, an episode list of the plurality of episodes included in the specific content is output on the user terminal.

6. The method of claim 5, wherein the service page includes a first functional icon linked to a function of generating a resulting image which differs from the resulting image using the source image and the drawing style of the specific content, and when the first functional icon is selected by the user terminal, the resulting image which differs from the resulting image provided on the service page is generated and provided on the service page.

7. The method of claim 6, wherein the service page includes a second functional icon linked to a function of generating the resulting image using a drawing style of a different content from the specific content, and when the second functional icon is selected by the user terminal, a resulting image generated using the source image and the drawing style of the different content is provided on the service page.

8. The method of claim 7, wherein, when the resulting image generated using the drawing style of the different content is provided, information about the different content is displayed on the service page, and based on when the information about the different content is selected, an episode list of the plurality of episodes included in the different content is output on the user terminal.

9. The method of claim 8, wherein the generating of the resulting image using the source image and the drawing style of the specific content includes generating an image set including a plurality of different resulting images using the source image and the drawing style of the specific content.

10. The method of claim 9, wherein, when the first functional icon is selected by the user terminal, an image set which differs from the plurality of resulting images included in the image set is generated by using the source image and the drawing style of the specific content.

11. The method of claim 1, wherein the source image overlaps one area of the resulting image, and a title of the specific content overlaps another one area.

12. The method of claim 1, wherein expected required time information required to generate the resulting image is provided to the user terminal, and the expected required time information is calculated based on when a request for generating the resulting image from the user terminal is received.

13. The method of claim 1, further comprising checking whether the source image is a harmful image, wherein, as a checking result, when the source image is the harmful image, the generation of the resulting image is restricted.

14. The method of claim 13, further comprising specifying a user account selecting the harmful image as a service use restricted user, wherein the service use restricted user is restricted from accessing the image generating service for a preset time.

15. The method of claim 14, wherein, when the user account logged in to the user terminal is the service use restricted user, an output of the service page is restricted.

16. A system for generating an image using a content provided from a content providing service, the system comprising a control unit configured to receive a specific content having a specific drawing style selected from a user terminal among a plurality of contents provided from the content providing service, wherein the control unit is configured to:

specify a predetermined source image having an appearance that is to be edited based on the selected specific content;

generate a resulting image using the source image and the drawing style of the specific content; and provide the resulting image to the user terminal, wherein the resulting image is provided as a separate image from the specific content and has the appearance of the source image in the specific drawing style of the specific content.

17. A non-transitory computer readable recording medium storing a program which, when executed by one or more processors, causes the processors to perform the steps comprising:

receiving a specific content having a specific drawing style selected from a user terminal among a plurality of contents provided from a content providing service;

specifying a predetermined source image having an appearance that is to be edited based on the selected specific content;

generating a resulting image using the source image and the drawing style of the specific content; and providing the resulting image to the user terminal, wherein the resulting image is provided as a separate image from the specific content and has the appearance of the source image in the drawing style of the specific content.

\*　　\*　　\*　　\*　　\*